US009538389B2

United States Patent
Irnich et al.

(10) Patent No.: US 9,538,389 B2
(45) Date of Patent: Jan. 3, 2017

(54) WHITE SPACE CHANNEL SELECTION FOR CELLULAR NETWORKS

(71) Applicant: Telefonaktiebolaget L M Ericsson (publ), Stockholm (SE)

(72) Inventors: Tim Irnich, Neuss (DE); Torsten Dudda, Aachen (DE); Yngve Selén, Uppsala (DE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 14/434,952

(22) PCT Filed: Oct. 14, 2013

(86) PCT No.: PCT/EP2013/071441
§ 371 (c)(1),
(2) Date: Apr. 10, 2015

(87) PCT Pub. No.: WO2014/057138
PCT Pub. Date: Apr. 17, 2014

(65) Prior Publication Data
US 2015/0237506 A1    Aug. 20, 2015

Related U.S. Application Data

(60) Provisional application No. 61/712,911, filed on Oct. 12, 2012.

(51) Int. Cl.
*H04W 72/00* (2009.01)
*H04W 16/14* (2009.01)
(Continued)

(52) U.S. Cl.
CPC ........... *H04W 16/14* (2013.01); *H04W 72/044* (2013.01); *H04W 72/085* (2013.01)

(58) Field of Classification Search
CPC ... H04W 16/14; H04W 72/044; H04W 72/085
(Continued)

(56) References Cited

U.S. PATENT DOCUMENTS 5,530,917 A * 6/1996 Andersson ............ H04W 28/08
455/436
5,754,958 A * 5/1998 Tsuji .................... H04W 48/06
455/436
(Continued)

FOREIGN PATENT DOCUMENTS

EP    2028891 A1    2/2009

OTHER PUBLICATIONS

Rappaport, Theodore S., "Wireless Communications: Principles and Practice", Prentice Hall, 2nd edition, Jan. 2002, 68-71.
(Continued)

*Primary Examiner* — Babar Sarwar
(74) *Attorney, Agent, or Firm* — Murphy, Bilak & Homiller, PLLC (57) ABSTRACT

A method in a configuration node of a cellular network for selecting, from a set of channels of at least one primary system, at least one channel for allocation to base stations of the cellular network is provided. The method comprises the steps: Receiving, from a database, a set of channels of the at least one primary system; Observing a quality ranking of the channels of the received set of channels; Determining an optimal number of channels for the cellular network on the basis of the ranked set of channels such that a signal quality in the cellular network is optimized; and Selecting from the received set of channels on the basis of the quality ranking and the determined optimal number of channels, at least one channel for allocation to base stations of the cellular network. A corresponding configuration node is also provided.

29 Claims, 4 Drawing Sheets

(51) Int. Cl.
*H04W 72/08* (2009.01)
*H04W 72/04* (2009.01)

(58) Field of Classification Search
USPC .......... 455/420–422.1, 434, 435.2, 436, 442, 455/444, 448, 450, 452.1, 452.2, 454, 455/456.1, 560–561, 67.11; 370/328–332
See application file for complete search history.

(56) References Cited

U.S. PATENT DOCUMENTS

| | | | | |
|---|---|---|---|---|
| 6,591,107 | B1* | 7/2003 | Sonetaka | H04W 72/10 455/450 |
| 6,606,499 | B1* | 8/2003 | Verrier | H04W 72/085 370/332 |
| 6,747,965 | B1* | 6/2004 | Nara | H04W 36/18 370/335 |
| 8,254,996 | B2* | 8/2012 | Shuai | H04W 72/085 370/232 |
| 2002/0186749 | A1* | 12/2002 | Jones | H04B 1/715 375/132 |
| 2009/0305713 | A1* | 12/2009 | Yamazaki | H04W 72/082 455/450 |
| 2010/0069013 | A1* | 3/2010 | Chaudhri | H04W 16/14 455/67.11 |
| 2010/0159974 | A1* | 6/2010 | Katayama | H04W 72/10 455/513 |
| 2011/0287802 | A1* | 11/2011 | Ma | H04L 5/0066 455/517 |
| 2012/0026970 | A1* | 2/2012 | Winters | H04B 7/0632 370/330 |
| 2012/0195216 | A1* | 8/2012 | Wu | H04W 72/0486 370/252 |

OTHER PUBLICATIONS

Dudda, Torsten et al., "Capacity of cellular networks deployed in TV White Space", Accepted for publication at IEEE DySPAN 2012, Seattle, Washington, US, Oct. 2012, 1-12.

Unknown, Author, "Technical and operational requirements for the possible operation of cognitive radio systems in the 'white spaces' of the frequency band 470-790 MHz", ECC Report 159, European Conference of Postal and Telecommunication Administrations, Jan. 2011, 1-160.

* cited by examiner

WHITE SPACE CHANNEL SELECTION FOR CELLULAR NETWORKS

TECHNICAL FILED

The present application relates to methods in a configuration node of a cellular network for selecting, from a set of channels of at least one primary system, at least one channel for allocation to base stations of the cellular network. The application further relates to corresponding configuration nodes.

BACKGROUND

Some users of radio spectrum do not use their allocated frequency bandwidth completely at all times and at all locations; they (sometimes temporarily, sometimes also constantly) leave certain channels unused at given locations and/or during certain time periods. These unused channels are called white spaces. White spaces are most widely discussed at the example of the TV band (i.e. the frequency range between 470 and ~800 MHz that is used for terrestrial television broadcasting), but the concept is general and could be applied in other bands as well.

White spaces can under certain circumstances be used by other users than the original users. In order to do that it is typically a regulatory requirement for them to operate as secondary users, i.e. to operate (i) without causing harmful interference to the original (these are typically called primary) users and (ii) to accept any interference from the primary users. In order to ensure that no harmful interference is caused, the operational parameters of secondary users are typically subject to regulatory limitations (e.g. with regard to the allowed transmit power, antenna height and other antenna characteristics, etc.). A detailed description of technical and operational requirements of one possible operation in white spaces can be found in CEPT-ECC, Technical and operational requirements for the possible operation of cognitive radio systems in the 'white spaces' of the frequency band 470-790 MHz (ECC Report 159), European Conference of Postal and Telecommunication Administrations, January 2011, htttp://www.erodocdb.dk/docs/doc98/official/Pdf/ECCRep159.pdf.

One relevant practical case is that a primary user uses a given channel only in certain locations, and that secondary use is possible outside those locations. In these cases typically no or very little temporal variation is observed.

For this case a promising technical solution to enable white space usage is to use a geo-location database that is able to determine the required operational limitations for one or several secondary users based on information about the users' locations (which is provided to the database as part of a database query). In current regulatory frameworks (e.g. in the US and in Europe) it is foreseen that the database returns a list of locally available channels together with related operational limitations, and it is up to the secondary users to determine how many and which of these channels should be used (i.e. a device can use up to all locally available channels but will normally not do so since devices will be limited in their capabilities, e.g., to simultaneously use non contiguous spectrum chunks).

In this context a cellular network using white space and receiving a range of available channels with associated constraints (such as a allowed transmit power or an expected interference level) has to make an ad-hoc decision how many and which channels to choose. Further, the selected channels shall be allocated to base stations within the cellular network in an optimal or reasonable way.

Accordingly there is a need for techniques which in an ad-hoc manner select channels of a white space for a secondary user. There is another need to assign or allocate the selected channels to base stations of the cellular network in an optimal way.

SUMMARY

According to one aspect, a method in a configuration node of a cellular network for selecting, from a set of channels of at least one primary system, at least one channel for allocation to base stations of the cellular network is provided. The method comprises the steps: Receiving, from a database, a set of channels of the at least one primary system; Observing a quality ranking of the channels of the received set of channels; Determining an optimal number of channels for the cellular network on the basis of the ranked set of channels such that a signal quality in the cellular network is optimized; and Selecting from the received set of channels on the basis of the quality ranking and the determined optimal number of channels, at least one channel for allocation to base stations of the cellular network.

According to one aspect, configuration node for a cellular network for selecting from a set of channels of at least one primary system, at least one channel for allocation to base stations of the cellular network is provided. The configuration node comprises a receiver for receiving, from a database, a set of the at least one primary system; and a processor for observing a quality ranking of the channels of the received set of channels, for determining an optimal number of channels for the cellular network on the basis of the ranked set of channels such that a signal quality in the cellular network is optimized, and for selecting, from the received set of channels on the basis of the quality ranking and the determined optimal number of channels, at least one channel for allocation to base stations of the cellular network.

According to one aspect, a computer program comprising program code to be executed by at least one processor of a configuration node of a cellular network is provided. The execution of the program code causes the configuration node to operate in accordance with the method.

DETAILED DESCRIPTION

In the following, various embodiments will be explained and discussed in more detail by referring to exemplary embodiments and to the accompanying drawings. The application generally relates to methods and nodes for supporting operation of cellular networks in white space spectrum.

White space refers to frequencies or channels that are allocated to a primary user (e.g. by means of a license), but are temporally or locally unused by this primary user, and thus might be utilized by a secondary user, e.g. a cellular network. The concept of white space has also been discussed in the background section and will be further defined in later sections. A key property of white space spectrum is that it is fragmented and the individual chunks at any given location in general have different properties in terms of operational limitations (e.g. transmit power) and interference from primary users.

Figure 1:
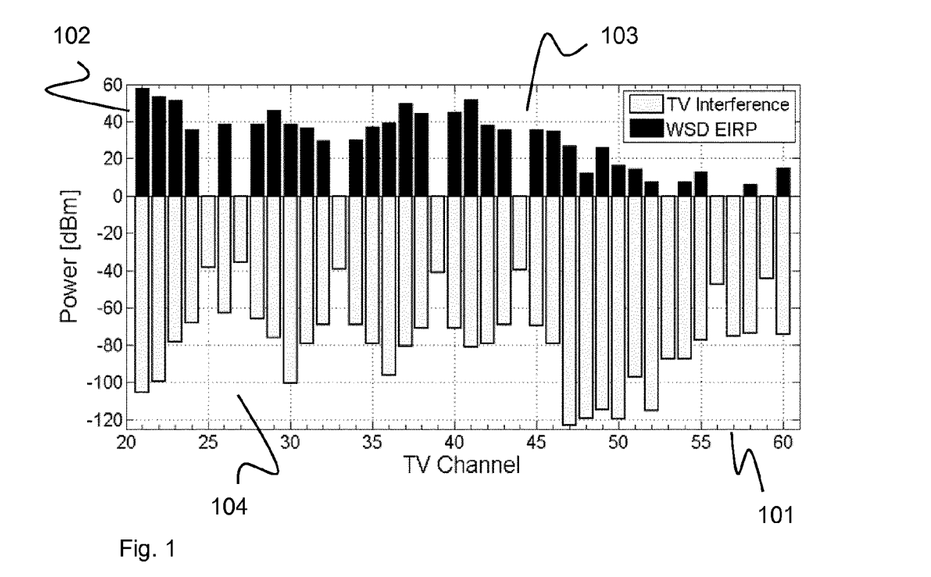
FIG. 1 shows as, an example, a TV white space availability at a point or area in central Berlin, Germany.

This is exemplary illustrated in FIG. 1, which shows the white space availability in the TV band (470-790 MHz) at a particular location or area in Berlin, Germany. This white space availability may be valid for a particular geographical area. On an x-axis 101 channels are numbered, on a y-axis 102 powers in dBm are given for each channel. An upper part 103 gives the White Space Device (WSD) Equivalent Isotropically Radiated Power (EIRP) on the considered channels. A lower part 104 gives the TV interference on the respective channels. Available spectrum (i.e. the channels that allow non-zero transmit power) consists of 9 chunks in total, where chunks contain between 1 and 8 TV channels. In view of the discussed property of white space spectrum one task is that a secondary user has to choose how many and which channels to use.

The secondary user may somehow "rank" the locally available channels, so that it can determine which channel is "best", "second best", etc. For the particular case of operating cellular networks in white space spectrum, the solution of operating all base stations on the "best" channel (according to the ranking metric used) can lead to suboptimal network performance, since at the cell edges (where SINR (Signal to Noise and Interference Ratio) normally is around 0 dB due to inter-cell interference, a situation for which today's technology is designed) interference from primary users can cause areas where SINR is significantly below 0 dB and thus create areas of network outage. That is, it is not possible to achieve contiguous coverage. So besides the problem of inter system interference, i.e. interference from a primary to a cellular network (secondary system) or from a cellular network to a primary system, there is also the problem of inter cell interference of the secondary system.

One way of improving the situation is to not operate all base stations on the "best" channel, but to operate some base stations on one or more of the other channels of lower quality. This poses the question of how many channels should be used (e.g., the best and the second best, the three best channels, etc.). The gains in using multiple channels can also be interpreted as a reuse gain: It may be beneficial for a system to run neighboring base stations on different channels such that the intra-system interference is reduced, even if this means not selecting the "locally best" channel for each individual base station.

The discussed embodiments provide solutions to the problems of (i) determining how many and which channels of a white space should be used by a secondary system and (ii) allocating base stations to those channels so that the performance is optimized for the secondary system.

Since often more than one white space channel is available at a given location, not necessarily all BSs of a cellular network have to operate on the same channel. By moving some BSs to channels other than the locally most preferable one (e.g. the second best channel), the cell edge coverage problem for those BSs staying on the best channel can be solved (since the distance to the closest co-channel interferer is increased). Also, the cell edge coverage problem may be solved for the BSs moving to the second channel, since they will see less interference from the BSs staying on the first channel.

Figure 2:
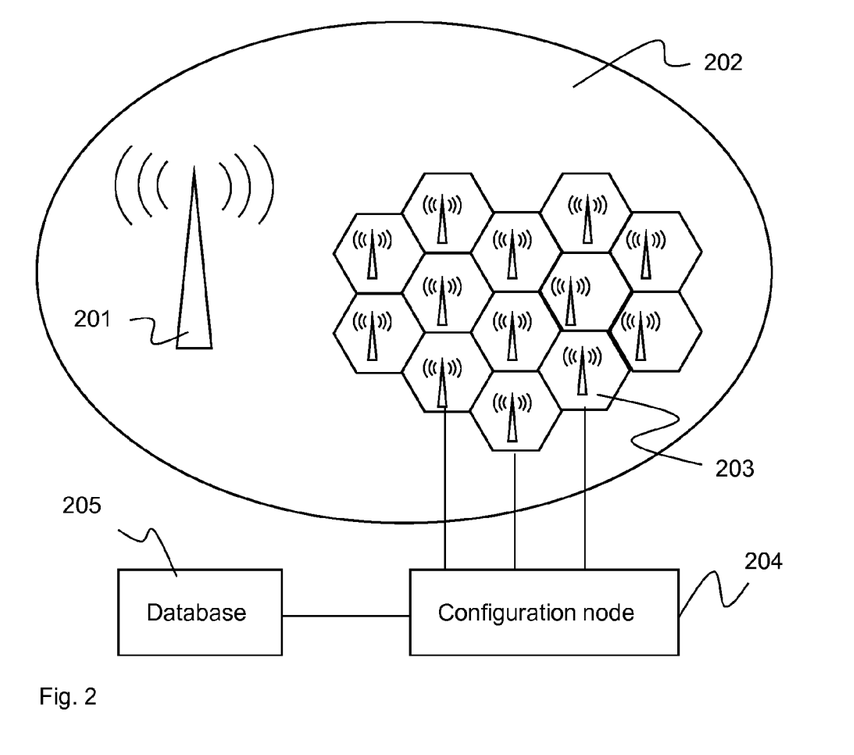
FIG. 2 schematically illustrates an exemplary network environment, in which various embodiments may be applied.

FIG. 2 shows an exemplary scenario, in which various embodiments can be applied. A primary system 201, such as a TV broadcasting network, covers a coverage area 202. In the coverage area 202 a cellular network 203 is operated. The cellular network 203 may be a part of a larger cellular network. The primary system 201 is operated on particular frequency bands or channels. The cellular network 203 (secondary system) shall be operated on frequency bands or channels already occupied by the primary system 201. A configuration node 204 receives, possibly after a request, from a database 205 a set of channels used or licensed by the primary system. The received channels are generally available for the cellular network.

These channels are ranked according to a quality of the respective channel. A quality can be a transmission quality indicating that a particular channel is suited for a transmission with a particular quality. An example of a transmission quality is an allowed transmit power of base station of the cellular network 203. The allowed transmit power may be set to a particular maximum value such that users of the primary system 201 are not disturbed by transmissions of the cellular network 203. Another example is a primary systems interference level, indicating a level of interference experienced by the cellular network from the primary network on a particular channel of the set of channels. The ranking of the channels within the set of channels may be performed within the database 205 or by the configuration node 204. The configuration node 204 may receive the set of channels from the database 205, wherein channels of the set of channels may be associated with quality values such as an allowed transmit power of the secondary system, such as the cellular network 203, and a level of interference of e.g. the primary system 201.

The configuration node 204 may configure which channel or channels are individually used by base stations of the cellular network 203. Each channel of the set of channels may show a different transmission quality. The transmission quality basically indicates whether the particular channel is suited for use in the cellular network and gives a quality of the channel in the cellular network 203. The transmission quality of a channel may be determined on the basis of several quality values such as the allowed transmit power and a level of interference, which may be provided by the database 205.

In case every base station of the cellular network 203 would operate on the same channel or frequency, e.g. the one showing the best quality, neighboring base stations may suffer from inter cell interference. Further, terminals associated to one base station may suffer from interference from a neighboring cell particularly when they are close to a cell edge (cell edge interference). The inter cell interference and cell edge interference can potentially be reduced when a second channel or frequency band is selected and both channels (or frequency bands) are distributed among the base stations. I.e. different bases stations may operate on different channel. The distribution may be done according to a pattern, e.g. a reuse pattern, or on the basis of a number of channels. In certain circumstances it may be referred to the number by a reuse factor. Then some base stations would use the first one channel other base station would use a second channel. This example corresponds to a case where a number of channels is set to two or where a frequency reuse of two is used. The frequency reuse or reuse factor may correspond to the number of channels of the provided set of channels selected for utilization in the cellular network.

The configuration node 204 determines for different numbers of channels a signal quality in the cellular network. The signal quality can, for example, be indicated by a cell edge interference, inter cell interference, a cell edge signal to interference and noise ratio, an average cell edge signal to interference and noise ratio, interference measured or determined at the edge of a cell and further suited measures to indicate the signal quality. The signal quality may be determined based on measurements and/or based on computations which often rely on a model of the cellular network.

The configuration node 204 selects an optimal a number of channels, which shows the best signal quality. In this way a number of channels is selected optimizing a signal quality within the cellular network 203. Further examples are, the number of channels is selected such that a certain quality of service requirement can be met or such that particular throughput in the network can be reached or such that interference situation at a cell edge is improved. Generally, the performance of the cellular network 203 shall be optimized.

For example, when an optimal number of channels is three, the three channels having the highest ranking in the ranked set of channels are selected and then distributed among the base stations of the cellular network 203.

Essentially, the determined number of channels and the ranking in the list or set of channels define the channels which are selected and which are foreseen to be distributed in the wireless network 203. For example, if an optimal number of channels is three, the three channels with the highest ranking or best quality are selected (the first three in a list ordered according to quality metric). The channels to be distributed among the base stations of the cellular network are a subset of the set of ranked channels. From this subset the configuration node 204 assigns or allocates one or more particular channels to a particular base station. For example, this assignment may be based on a particular pattern, e.g. a reuse pattern, or a particular method, or the determined optimal number of channels (reuse factor). The assignment may also be done randomly or according to a particular probability distribution associated to the subset of channels. For example, a selected channel with higher quality is associated with a higher probability as a channel with lower quality. The assignment or allocation of selected channels to base stations may be made on the basis of the associated probabilities. I.e. a selected channel with higher probability is allocated more often than a selected channel with lower probability. In general, at least based on the ranking and the determined optimal number of channels, the configuration node 204 selects a channel to be allocated to a particular base station of the cellular network 203.

The selected channel is then allocated to the particular base station. Normally, neighboring base stations will receive different channels (if this is possible), e.g. such that cell edge interference between neighboring base stations is reduced or mitigated. The configuration node 204 may also assign multiple channels to a particular base station. The allocation may be performed by sending a message from the configuration node 204 to the particular base station indicating the channel(s) on which the particular base station shall operate.

The configuration node 204 may receive or request the set of channels from the database on a regular basis. For example, the set of channels, normally together with the ranking or associated quality information, may be updated every couple of hours, e.g. every two hours. Based on the updated set of channels, the configuration node 204 may update the distribution of channels within the cellular network. So, also the selection of a channel for a particular base station of the cellular network 203 may be updated regularly, for example when an update of the (possibly ranked) set of channels is obtained. In this way an automatic and optimized channel distribution is obtained within the cellular network 203 which operates as a secondary network in channels also used by the primary network 201.

As the distribution of channels among the base stations or the allocation of a particular channel of the set of channels to a particular base station shall be done in an ad hoc manner, the process to select and possibly allocate the channels is to be done efficiently, i.e. using low computational complexity and low signaling overhead. For example, the data base may be updated regularly or the quality or availability of certain channels may vary over time. E.g. a TV channel of a primary system is only utilized for a certain period of time during a day. The channels to be utilized in the network need to be selected and allocated in a timely manner in response to a changing environment such as end or start of a broadcasting period of a certain channel.

One option to further increase the efficiency in determining an optimal number of channels is to determine a signal quality (e.g. a cell edge interference) for a first number of channels. This is normally the smallest number of channels of the possible number of channels, e.g. the smallest number of channels is normally equal to one. A further signal quality is then again determined for another number of channels, normally a higher number of channels, e.g. the higher number of channels can be two or three. This process is repeated until a signal quality is obtained that is worse than the one or more signal qualities already determined. Thus, in most cases, the signal quality is determined for a subset of all possible numbers of channels only, which reduces required processing, signaling and/or measurements. Then, the number of channels is selected which shows the best signal quality. In this way an optimal number of channels (reuse factor) can be determined in an efficient and fast way. Based on the selected number of channels the distribution of channels in the network is performed.

Normally, the selected channels to be distributed in the cellular network are evenly distributed, i.e. every channel is approximately used to the same amount (equally often). This is also known as a regular reuse pattern. However, one option is to not use an even distribution of channels in the network, but to distribute according to the ranking of the channels in the set of channels. So, channels having a higher ranking are more often distributed than channels having a lower ranking. In other words, the probability that a particular channel is allocated to a particular base station is higher the higher the ranking in the set of channels. Still, only channels of the selected subset of channels (that is of the size of the selected number or channels) may be distributed within the cellular network.

In general, the ranked set of channels is valid for the entire cellular network 203. One option is to make the ranked set of channels specific for each base station or sub-groups of base stations within the cellular network. In this case each base station within the cellular network 203 is associated with a base station specific set of channels. I.e., the ranking may be different from base station to base station; the quality for each channel may be different from base station to base station and/or the channels within the base station specific set may be different from base station to base station. By using a base station specific ranking or a base station specific set of channels in the above described procedures the quality of service or performance of the network 203 can be further improved.

The configuration node may also perform the steps of determining, on the basis of the ranked set of channels, an optimal pattern for allocation of channels of the set of channels to base stations of the cellular network, such that a signal quality in the cellular network is optimized; and of selecting the at least one channel for allocation to base stations of the cellular network also on the basis of the determined optimal pattern. In this way the selected channels are also optimal in view of the respective allocation pattern of the channels.

Normally the received set of channels and the received or determined quality parameters associated with each channel are valid for the entire cellular network 203. The cellular network 203, however, may be a sub-network of a larger network, wherein the set of channels and quality information is valid for the sub-network. Normally the set of channels of a white space associated with quality parameters is valid for a certain geographical area, so they are valid for a network or a sub-network covering at least a part of said geographical area.

The configuration node 204 may be part of one of the base station of the cellular network 203. This base station may be connected to the neighboring bases station for communicating allocated channels. The configuration node 204 may be an eNodeB in an LTE based cellular network or a NodeB in a UMTS based cellular network. Alternatively, the configuration node 204 may be implemented in an OSS, Operating Support System or any other control node for configuring base stations of the wireless network 203.

Figure 3:
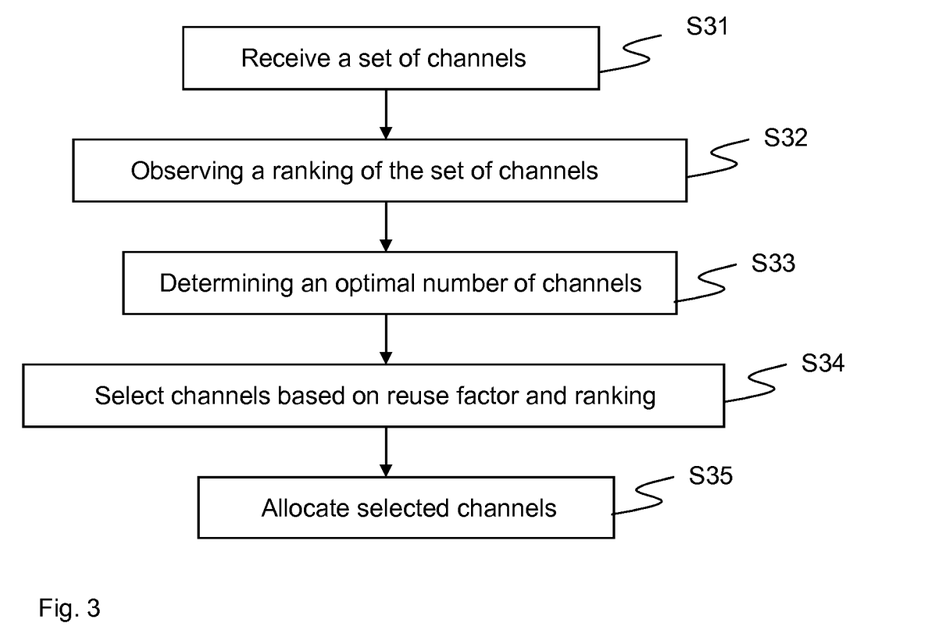
FIG. 3 shows a flowchart for illustrating a method according to various embodiments.

FIG. 3 shows a flowchart for illustrating a method for selecting, from a set of channels, at least one channel and/or for allocating the selected at least one channel to base stations of a cellular network. In a broader scale, one or more channels may be distributed among or allocated to base stations in the cellular network. The respective base station may then operate on the selected and allocated channel. The method may run in a configuration node. Several aspects of the method have already been described with respect to FIG. 2. The set of channels is used by at least one primary user, i.e. the set of channels is a set of channels of a white space spectrum. The cellular network is acting as a secondary user. In principle the primary and the secondary system can be exchanged. Normally, the primary and the secondary user overlap each other in a geographical area or location. I.e. the primary and the secondary system may both be operated in the same geographical area. Most commonly the cellular network or a part- or sub-network of a larger network covers geographically an area which lies within the coverage area or interfering area of one or more primary systems. The primary system however may not use or broadcast on all channels licensed to the primary user at any time in the geographical area. So in principle certain channels initially assigned to the primary system can be used by the secondary system as long as certain restrictions regarding maximum transmit power, level of interference to be accepted, time restrictions and location restrictions are obeyed.

In a step S31, a configuration node receives a set of channels from a data base. The set of channels is part of a white space spectrum. So they are initially allocated to the primary user. Normally the primary user has licensed these channels, such that the primary user is normally free to use these channels. The channels may be ranked according to their quality. A quality can be indicated by an allowed transmit power and/or an interference level from the primary user. Such a transmission quality can be associated with every channel in the set of channels. The ranking of the channels is based on the transmission quality associated with the respective channel. The higher the ranking the better is the quality associated to a channel.

In a step S32, a ranking of the channels in the set of channels is observed. The received set of channels can already be ranked in the database. The database may also comprise several parameters defining a transmission quality for each channel. The configuration node may obtain the ranking and possibly also the transmission quality associated with the channels from the database. Alternatively, the configuration node will determine the ranking and or the transmission quality e.g. via measurements.

In step S33, a number of channels is determined such that a signal quality is optimized. One may also refer to the optimal number of channels of the set of channels as an optimal frequency reuse factor. For example, for a plurality of numbers of channels a signal quality will be determined. This can be done via measurements or by using models approximating the cellular network to be configured. The measurements can be performed by terminals that are associated to the base station(s) of the cellular network and/or by the base stations. Measurements may comprise signal and/or interference measurements.

For example, for multiple numbers of channels a signal quality is determined. The number of channels showing the best signal quality is selected. The selected number of channels determines the number of channels of the set of channels to be distributed in the network. The channels having the highest ranking are selected up to the value of the selected number of channels.

In a step S34 at least one channel is selected on the basis of the ranked set of channels and the determined number of channels. In other words, from the ranking and the determined number of channels a subset of channels is selected from the set of channels. It is foreseen to distribute selected channels among the base stations of the cellular network. From the subset one channel is normally selected and allocated to a particular base station. This distribution can be done randomly or also according to a particular pattern, based on the selected number of channels, e.g. a reuse pattern. For example, the determined number of channels is three, then the three channels of the set showing the highest ranking are normally selected. The selected channels are foreseen to be individually allocated to certain base stations of the cellular network.

In an optional step S35, the selected channels are allocated to base stations of the cellular network. This allocation normally follows a certain pattern, e.g. a reuse pattern. For example, a regular pattern is used or the allocation can be done on a random allocation of selected channels and base stations. After the allocation a channel allocation pattern is obtained, which essentially defines which of selected channel is/are allocated to which base station of the cellular network. One option to inform a base station of the channels allocated is to send a message from the configuration node to the base station informing the base station of one or more channels on which the base station shall operate.

A further option is to determine the signal quality for a subset of all possible numbers of channels only. For example, a termination condition can be used within the iterative process to determine signal quality for different numbers of channels as discussed above.

As also already discussed with respect to FIG. 2, one option is that the probability of allocating a particular channel depends on the ranking or the quality of that channel. Then channels of higher rank or quality in the determined subset of channels to be used for distribution are used more often than the ones having lower rank. A further option is that the ranking or quality is specific for each base station in the network as already discussed with respect to FIG. 2.

It is to be understood that certain steps are optional (even if not explicitly mentioned) and that several steps can be performed simultaneously or successively in various orders.

Figure 4:
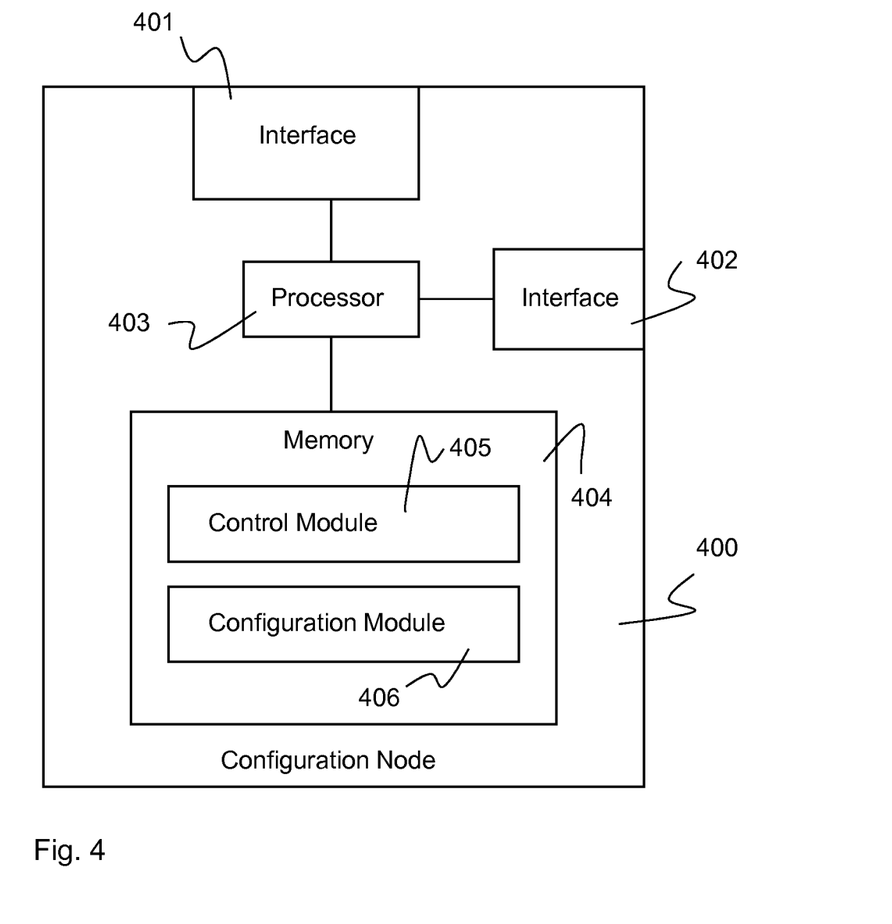
FIG. 4 schematically illustrates exemplary structures of a configuration node for implementing of various embodiments.

FIG. 4 schematically illustrates exemplary structures of a configuration node 400 for implementing of various embodiments. The configuration node 400 may be part of the cellular network, e.g., corresponds to a base station of the cellular network. However, similar functionalities could also be implemented in other nodes of the cellular network, e.g., in control or switching nodes of the cellular network or in core network nodes. The network node may also correspond to an external node connected to the cellular network, e.g., via the Internet.

In the illustrated example, the configuration node 400 includes a first interface 401 for communication with one or more databases. In addition, the configuration node 400 may include a second interface 402 for communication directly or indirectly with nodes of the cellular network.

Further, the configuration node 400 includes a processor 33 coupled to the interfaces 401 and 402 and a memory 404 coupled to the processor 403. The memory 404 may include a ROM, e.g., a flash ROM, a RAM, e.g., a DRAM or SRAM, a mass storage, e.g., a hard disk or solid state disk, or the like. The memory 404 includes suitably configured program code to be executed by the processor 403 so as to implement the above-described functionalities for allocating a selected channel to the at least one base station or for distributing channels within a cellular network. More specifically, the memory 404 may include a control module 405 for determining a number of channels and a further control module for selecting a channel (not illustrated in FIG. 4). Further, the memory 405 may include a configuration module 406 for allocating a selected channel to a base station. Further, the memory 404 may include further control modules, e.g., for implementing generic control functionalities of the configuration node.

It is to be understood that the structure as illustrated in FIG. 4 is merely schematic and that the configuration node 400 may actually include further components which, for the sake of clarity, have not been illustrated, e.g., further interfaces. For example, further network interfaces could be provided which are configured to allow communication with different types of other nodes, for example to receive measurement reports. Also, it is to be understood that the memory 404 may include further types of program code modules, which have not been illustrated, e.g., program code modules for implementing known functionalities of the configuration node, control node, switching node, or core network node of a cellular network. According to some embodiments, also a computer program product may be provided for implementing functionalities of the configuration node, e.g., in the form of a medium storing the program code to be stored in the memory 404.

In the following, concepts as outlined above will be described in further detail. The further description covers further concepts and embodiments, which in general can be combined with the concepts and embodiments describes so far.

One way to determine an optimal frequency reuse factor, which in this context corresponds to an optimal number of channels, is to use an approximation for calculating the worst case SINR, which is an example of a signal quality in the wireless network. The approximation may be based on a regular hexagonal grid for different frequency re-use factors. In this way it can, for example, be determined for which frequency re-use factor the cell edge SINR for those base stations operating on the worst channel is still better than the cell edge SINR for the re-use one case (i.e. all BS operate on the same channel). Further methods for selecting the channels (frequency bands) of operation are subsequently elaborated. Here, a worst case SINR, such as a worst case cell edge SINR is an example of a signal quality in the cellular network.

In one example, an approximation for the worst case (i.e. cell edge) SINR for a given frequency re-use factor in case of a regular hexagonal grid can be calculated from $$\text{SINR}(ch) = \frac{P(ch) * PL(R)}{P(ch) * (2(PL(R*(Q-1)) + 2(PL(R*Q) + 2(PL(R*(Q+1)))) + \text{Noise} + TVI(ch)} \quad (1)$$

where $Q=\text{sqrt}(3N)=D/R$, and $\text{SINR}(ch)$ is the cell edge SINR on channel ch, $N=\{1, 3, 4, 7, \ldots\}$ is the frequency re-use factor (when the re-use factor increases, the distance to the closest co-channel interferer and with that the cell edge SINR increases), $P(ch)$ is the allowed transmit power on channel ch (it is assumed that all BS on the same frequency have the same transmit power), $PL(R)$ is the path loss for distance R, $TVI(ch)$ is the interference from TV transmitters.

At a given location or geographical area there are 9 TV channels available, and the allowed transmit powers on these channels are $\{60, 50, 40, 30, 20, 20, 20, 20, 20\}$ dBm and the accumulated interference levels from TV transmitters are $\{-70, -70, -70, -70, -70, -60, -50, -40, -30\}$ dBm. Allowed transmit powers and the interference levels are examples of quality parameters associated with each channel. Based on such quality values a ranking of the channels can be determined according to which channels with better quality are ranked higher than channels with lower quality. A thermal noise level of $-105$ dBm, a cell radius of 1000 m and Hata suburban propagation for path loss calculation is selected for the modelling.

Figure 5:
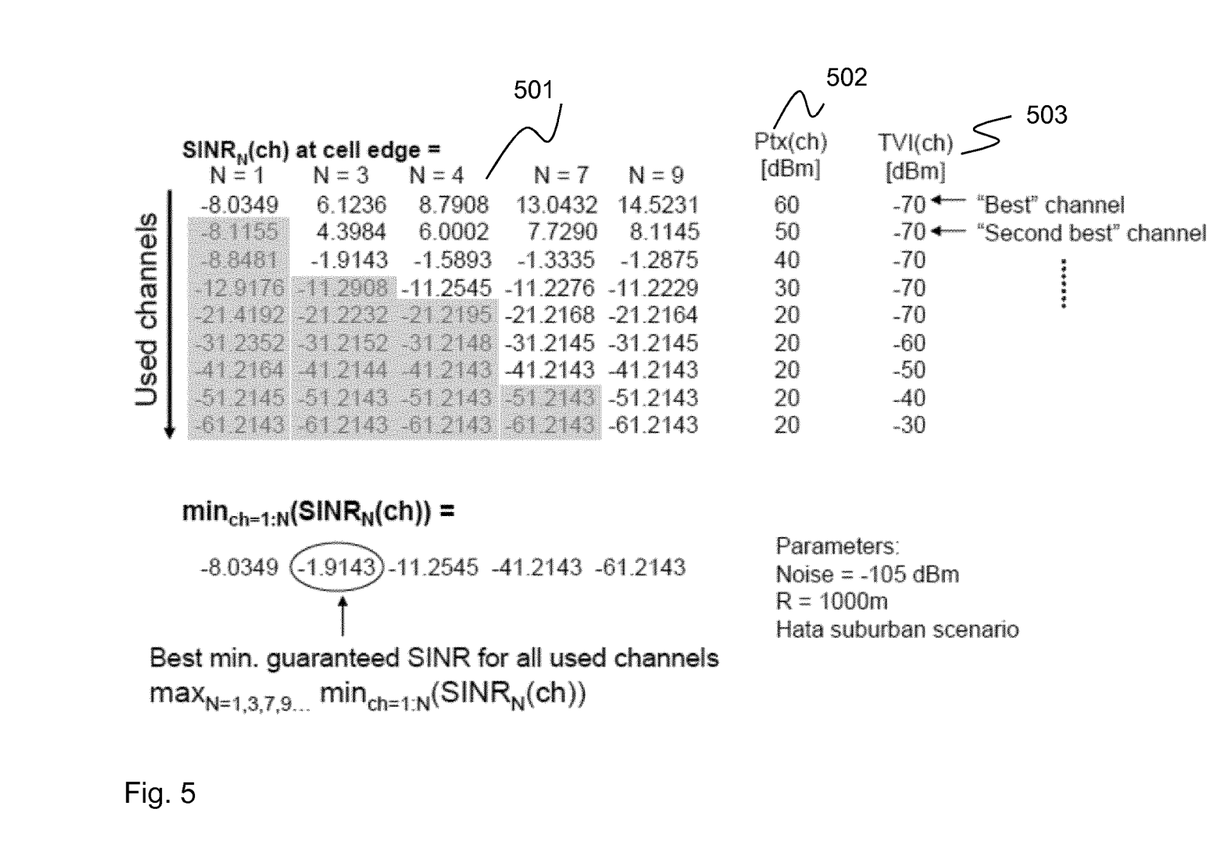
FIG. 5 shows numerical results associated with an embodiment.

FIG. 5 depicts numerical results in a table 501 delivered by equation (1) for the described example. Each row refers to one channel. The channels are ranked according to their quality. The columns refer to the number of used channels as indicated by N=1, N=3, N=4, N=7, and N=9, respectively. The number of used channels corresponds to a reuse factor. The values in the table 501 give the SINR of the channel (an example of the signal quality) for the respective reuse factor. The higher the value of the SINR, the better is the quality of the respective channel. In this example, using the three best channels is optimal since all cells improve, e.g. when compared to the case of N=1. For N=4, the cells landing on the $4^{th}$ best channel have worse cell edge SINR than in case N=1.

It can be seen that operating all BSs on the best channel (which in this example is defined as the channel having the highest allowed transmit power and the lowest interference) leads to a cell edge SINR of about $-8$ dB, which will typically lead to some outage at the cell edge (for example, LTE typically works from $-5$ dB SINR and above). The ranking of the channels is done according to their quality, which is in this example the highest allowed transmit power Ptx, see column 502 and the lowest interference TVI, see column 503. Using the three best channels, i.e. setting the selected reuse factor to three, and allocating the BSs to those three channels in a regular re-use-three-pattern instead leads to an SINR between about 6 and −2 dB, which introduces some heterogeneity in cell performance but improves performance also in the worst case by more than 6 dB. Using a re-use four pattern, i.e. selecting a reuse factor of four, instead leads to a lower worst case SINR compared with the re-use one case and would thus in case of a regular re-use-four pattern for 25% of all BSs lead to a performance decrease instead of an increase. Therefore the conclusion is that a re-use three pattern (i.e. a reuse factor of three) using the three best channels is optimal in this example.

The above method for calculating cell edge SINR is only one possible example and it considers the approximation where a regular hexagonal grid in a homogeneous deployment consisting of only macro cells and evenly distributed re-use patterns are foreseen. In practice, site locations of networks are often not equidistant. To improve the approximation, in these cases cell edge SINR or possibly other quality parameters for a given frequency re-use factor or number of used channels can be determined based on measurements or through network planning. In general, deployments can also be heterogeneous (i.e. Macro and Pico cells using the same frequency band).

In the following a number of algorithms for channel selection and algorithms for base station allocation are described. One algorithm foresees the approximation of homogeneous hexagonal grids. This algorithm relates to the example/approximation described above. According to the approximation, base stations of a cellular network form a hexagonal cell grid i.e. all cells have the same radius. White space availability (i.e. availability of frequency bands) and interference levels are for the approximation seen to be constant over space or over the geographical area of the cellular network or part of the cellular network under consideration. I.e., the allowed transmit power Ptx(ch) and interference from primary user values TVI(ch) for the center site in the cell grid is valid for an entire cell grid (area of a cellular network). Any spatial variations are neglected.

In this case, the following parameters are used as input data to the algorithm: First, the allowed transmit power and primary user interference level for each locally available channel for one specific location (typically the center site or point in the planning area) or geographical area like in the example above. Further, a thermal noise level and cell radius is used as input. With respect to the cell radius it is approximated that base stations are located in the centers of the hexagons forming a regular hexagonal grid. If each of these hexagons has side length R, the inter-site distance is 0.86*2*R and the cell radius is 0.86*R. A path loss for a distance that equals the cell radius is foreseen.

According to one example, the algorithm performs the following steps. The algorithm refers to the cell edge SINR as a quality parameter. In principle many other quality parameters could be used equally well.

1. Calculate cell edge SINR for the frequency re-use factor of one (i.e. all BS on the best channel) using equation (1) above.

2. Calculate cell edge SINR for the next higher possible re-use factor N, N={1, 3, 4, 7, 9, . . . }, using equation (1) above and assuming that the N best channels are used and compare if the channel using the worst channel from the set of used channels (for example, for the re-use three case the third best channel) provides a better SINR than the re-use factor considered in the previous iteration.

3. If the result is better than in the previous iteration, repeat step 2 with the next higher re-use factor.

4. If the result is worse than in the previous iteration (meaning that we have found an at least locally optimal re-use factor in the previous iteration), use the re-use factor of the previous iteration.

5. Allocate 1/N of the base stations of the cellular network to the best channel, 1/N to the second best channel and so on according to a regular re-use pattern. This is one example, how the determined optimal set of channels can be distributed in the cellular network. Here, in principle, an even distribution is proposed.

According to one alternative, instead of comparing the cell edge SINR of the worst channel, the average cell edge SINR of all cells is compared for the exit condition.

Thereby it may be assumed that an equal number of BS is allocated to each used channel (i.e. the cell edge SINR of the best, second and third best channel are equally weighted in the averaging calculation).

According to an embodiment, the cell-edge SINR (worst or average) are computed for all N={1, 3, 4, 7, 9, . . . , Nmax}, and the selected value of N which is used in step 5 is the value that results in the best cell-edge SINR value.

In general, any metric instead of the SINR could be used, and also other optimization techniques instead of the max-min approach used above could be used depending on the metric. The metric shall give a signal quality in the cellular network.

A further approximation may be based on non-hexagonal clusters, and/or to irregular deployments. In this case the cell edge SINR or another quality value for the cellular network may be computed according to the respective selected scenario. A method for obtaining cell edge SINR may also or alternatively include the concept of Voronoi cells. A channel allocation problem may likely become NP-hard.

The described algorithms may further consider base station specific channel quality. In practice each BS will see a slightly different channel quality and maybe even different channels being available.

According to one embodiment, the allocation of BSs to the set of channels identified for usage could be included in the optimization problem for finding the right frequency re-use factor. Due to the location-dependency of channel quality observed in white space, performance of certain BSs or overall system performance can be optimized by assigning BSs in certain locations to certain channels. For example in a reuse N=3 scheme, 6 possible allocations exist to assign 3 channels to 3 BSs. In this embodiment step 2 is extended by another loop finding the optimum allocation possibility for each reuse factor N.

According to one embodiment, unequal split of BS between used channels is foreseen, i.e. instead of assigning 1/N BSs to each channel when using frequency re-use N, more BSs are assigned to the best channel and less to the worse channels. The differences between cells assigned to channels of different quality can be reduced in this way.

In one embodiment, instead of allocating a fixed number of BS to each channel per reuse factor (e.g. 1/N BSs to the best channel in reuse N scheme), a flexible number of BSs can be assigned to each channel. This especially leverages the downside of the algorithm of having to use bad channels when higher reuse is envisaged, while at the same time the best channel exceeds in its performance.

Subsequent concepts and embodiments are also of importance for irregular deployments. Yet another way of allocating BSs to channels is based on the following optimization-based approach: A binary channel allocation matrix C of size L (#BSs) by M (#channels) is sought; The ijth element Cij is 1 only if BS i uses channel j. The ith row vector in C is denoted by riT, the jth column vector in C is denoted cjT.

The real-valued channel quality matrices (one per channel) Qj, j=1, . . . , M, of size L by L is designed; the Qj are known (e.g., obtained by knowledge of deployments, user distributions, etc; . . . ). Element ii of Qj denotes the quality of BS i using channel j, i.e., typically a non-negative number (quality 0 means no system gain). Element ik, i≠k, is used to penalize BS i's quality when BS k is using the channel j simultaneously with BS i. Hence, the diagonal elements of Qj are typically non-negative, whereas the off-diagonal elements tend to be non-positive.

It is proposed to optimize (e.g.) the sum quality under a constraint on channel usage per BS by means of the following optimization approach:

$$\max_c \sum_{j=1}^{M} c_j^T Q_j c_j$$

subject to $$C\vec{1} = 1,$$
$$C_{ij} \in \{0, 1\}$$

where $\vec{1}$ is a column vector consisting of 1s. The quality matrix Qj can, e.g., be obtained by, for the diagonal elements, giving the throughput at the cell edge as computed when the corresponding BSs are single users of the channel j. The off diagonal elements ik, i≠k can be computed as the reduction in cell edge throughput for BS i when BS k is using channel j, as compared to when BS i was the sole user of the channel. Other measures that can be used are SINR and reduction in SINR, or functions taking the SINRs or throughputs as input.

Embodiments discussed so far support e.g. that intra-system interference may be reduced by the introduction of a frequency re-use. This will lead to higher SINR levels in the system.

Depending on how much worse the second best channel is, the situation can also improve for those BSs that are moved to the second best channel, since also for them the average distance to the closest co-channel interferer is increased. This improvement is however partially compensated by the performance penalty that comes from operating only on the second best channel (i.e. having to operate with less transmit power or having to live with more interference from primary users). It will thus not be optimal to use as many channels as possible, the optimum will be reached by a particular number of channels being used, and using more or less channels will lead to sub-optimal system performance. The terms channel and frequency band and also frequency reuse factor and channel reuse factor can be exchanged in respect to various embodiments described. I.e. when it is referred to a channel one may also refer to a frequency band. Further the term reuse factor is regularly used and corresponds to a number of channels. The channels may be used in a cellular network and may be allocated to base stations of the cellular network according to a particular allocation pattern.

Modifications and other variants of the described embodiments will come to mind to one skilled in the art having the benefit of the teachings presented in the foregoing descriptions and the associated drawings. Therefore it is to be understood that the embodiments are not to be limited to the specific examples disclosed and that modifications and other variants are intended to be included within the scope of the disclosure. Although specific terms may be employed herein, they are used in generic and descriptive sense only and not for purposes of limitation.

The disclosure also comprises for example the following embodiments:

E1. Embodiment involving a method in a configuration node of a cellular network for allocating frequency bands of at least one primary system to base stations of the cellular network, the method comprising the steps: Receiving, from a database, a set of frequency bands used by the at least one primary system; Observing a quality ranking of the frequency bands of the received set of frequency bands; Determining a frequency reuse factor for the cellular network on the basis of the ranked set of frequency bands such that a signal quality in the cellular network is optimized; Selecting frequency bands of the set according to the quality ranking and the determined frequency reuse factor; and Allocating the selected frequency bands to base stations of the cellular network according to a reuse pattern.

E2. Embodiment according to E1, wherein the reuse pattern is regular or is a random distribution of the selected frequency bands among base stations of the cellular network.

E3. Embodiment according to E1 or E2, the method further comprising the steps: Determining a quality of each frequency band of the set of frequency bands; and Ranking the frequency bands of the set according to the determined quality.

E4. Embodiment according to any one of E1 to E3, wherein the received set of frequencies is ranked according to a quality.

E5. Embodiment according to any one of E1 to E4, wherein the step of determining an optimal frequency reuse factor is performed by the steps: Receiving measurements of a signal quality in the cellular network for multiple frequency reuse factors; and Determining a frequency reuse factor showing the best signal quality.

E6. Embodiment according to any one of E1 to E5, the step of determining an optimal frequency reuse factor is performed by the steps: Determining for multiple reuse factors a signal quality in the cellular network; and Determining a frequency reuse factor showing the best signal quality.

E7. Embodiment according to any one of E1 to E6, the method further comprising the steps: Determining a signal quality for a frequency reuse factor; Increasing the frequency reuse factor and determining a further signal quality for the increased frequency reuse factor until a determined further signal quality is worse than a signal quality associated to the one or more reuse factors already considered; and Determining a frequency reuse factor showing the best signal quality.

E8. Embodiment according to any one of E1 to E7, wherein a selected frequency band having a higher ranking is allocated more often than a selected frequency band having a lower ranking.

E9. Embodiment according to any one of E1 to E8, further comprising the step: Receiving, from a database, a number of sets of frequency bands used by the at least one primary system, wherein each set is associated individually with one particular base station or group of base stations of the cellular network.

E10. Embodiment according to any one of E1 to E9, further comprising the step: Observing a number of quality rankings of the frequency bands of the set or sets individually for one particular base station or group of base stations of the cellular network.

E11. Embodiment involving a configuration node of a cellular network for allocating frequency bands of at least one primary system to base stations of the cellular network, the configuration node comprising: a receiver for receiving, from a database, a set of frequency bands used by the at least one primary system; and a processor for observing a quality ranking of the frequency bands of the received set of frequency bands, for determining a frequency reuse factor for the cellular network on the basis of the ranked set of frequency bands such that a signal quality in the cellular network is optimized, for selecting frequency bands of the set according to the quality ranking and the determined frequency reuse factor, and for allocating the selected frequency bands to base stations of the cellular network according to a reuse pattern.

E12. Embodiment according to E11, wherein the reuse pattern is regular or is a random distribution of the selected frequency bands among base stations of the cellular network.

E13. Embodiment according to E11 or E12, wherein the processor is further adapted to determine a quality of each frequency band of the set of frequency bands, and to ranking the frequency bands of the set according to the determined quality.

E14. Embodiment according to any one of E11 to E13, wherein the set of frequencies is ranked according to a quality.

E15. Embodiment according to any one of E11 to E14, the configuration node further comprising: a receiver for receiving measurements of a signal quality in the cellular network for multiple frequency reuse factors; and the processor is further adapted to determine a frequency reuse factor showing the best signal quality.

E16. Embodiment according to any one of E11 to E15, wherein the processor is further adapted to determine for multiple reuse factors a signal quality in the cellular network, and to determining a frequency reuse factor showing the best signal quality.

E17. Embodiment according to any one of E11 to E16, wherein the processor is further adapted to determine a signal quality for a frequency reuse factor, to increase the frequency reuse factor and to determine a further signal quality for the increased frequency reuse factor until a determined further signal quality is worse than a signal quality associated to the one or more reuse factors already considered, and to determining a frequency reuse factor showing the best signal quality.

E18. Embodiment according to any one of E11 to E17, wherein the processor is further adapted to allocate a selected frequency band having a higher ranking more often than a selected frequency band having a lower ranking.

E19. Embodiment according to any one of E11 to E18, the configuration node further comprising: a receiver for receiving, from a database, a number of sets of frequency bands used by the at least one primary system, wherein each set is associated individually with one particular base station or group of base stations of the cellular network.

E20. Embodiment according to any one of E11 to E19, wherein the processor is further adapted to observe a number of quality rankings of the frequency bands of the set or sets individually for one particular base station or group of base stations of the cellular network.

E21. Embodiment according to any one of E11 to E20, wherein the configuration node is adapted to perform the method according to any embodiment of 1 to 10.

The invention claimed is:

1. A method in a configuration node of a cellular network for selecting, from a set of channels of at least one primary system, at least one channel for allocation to base stations of the cellular network, the method comprising:
   receiving, from a database, a set of channels of the at least one primary system;
   observing a quality ranking of the channels of the received set of channels;
   determining an optimal number of channels for the cellular network on the basis of the ranked set of channels such that a signal quality in the cellular network is optimized; and
   selecting, from the received set of channels on the basis of the quality ranking and the determined optimal number of channels, at least one channel for allocation to base stations of the cellular network;
   wherein the method further comprises:
   determining a signal quality for a number of channels;
   increasing the number of channels and determining a further signal quality for the increased number of channels until a determined further signal quality is worse than a signal quality associated to the one or more numbers of channels already considered; and
   determining the optimal number of channels on the basis of the determined signal qualities.

2. The method of claim 1, the method further comprising:
   allocating the at least one selected channel to base stations of the cellular network according to a pattern.

3. The method of claim 1, wherein the allocation pattern is regular or is a random distribution of the selected channels among base stations of the cellular network.

4. The method of claim 1, the method further comprising:
   determining a quality of each channel of the received set of channels; and
   ranking the channels of the received set of channels according to the determined channel quality.

5. The method of claim 1, wherein the received set of channels is ranked according to a quality.

6. The method of claim 1, wherein the received set of channels comprises channels associated with at least one quality parameter.

7. The method of claim 1, wherein determining an optimal number of channels for the cellular network comprises:
   receiving measurements of a signal quality in the cellular network for multiple numbers of channels; and
   determining the optimal number of channels on the basis of the received measurements.

8. The method of claim 1, wherein determining an optimal number of channels comprises:
   determining for multiple numbers of channels a signal quality in the cellular network; and
   determining an optimal number of channels on the basis of the determined signal qualities.

9. The method of claim 1, wherein a selected channel having a higher ranking is allocated to base stations of the cellular network more often than a selected channel having a lower ranking.

10. The method of claim 1, further comprising:
    receiving, from a database, a number of sets of channels of the at least one primary system, wherein each set is associated individually with one particular base station or group of base stations of the cellular network.

11. The method of claim 1, further comprising:
observing a number of quality rankings of the channels of the set or sets individually for one particular base station or group of base stations of the cellular network.

12. The method of claim 1, wherein the signal quality is indicative of a cell-edge interference in the cellular network.

13. The method of claim 1, further comprising:
determining, on the basis of the ranked set of channels, an optimal pattern for allocation of channels of the set of channels to base stations of the cellular network, such that a signal quality in the cellular network is optimized; and
selecting the at least one channel for allocation to base stations of the cellular network also on the basis of the determined optimal pattern.

14. The method of claim 1, wherein the configuration node is a base station or an Operational Support System (OSS).

15. A configuration node for a cellular network for selecting from a set of channels of at least one primary system, at least one channel for allocation to base stations of the cellular network, the configuration node comprising:
a receiver configured to receive, from a database, a set of the at least one primary system; and
a processor configured to observe a quality ranking of the channels of the received set of channels, determine an optimal number of channels for the cellular network on the basis of the ranked set of channels such that a signal quality in the cellular network is optimized, and select, from the received set of channels on the basis of the quality ranking and the determined optimal number of channels, at least one channel for allocation to base stations of the cellular network;
wherein the processor is further configured to determine a signal quality for a number of channels, to increase the number of channels and to determine a further signal quality for the increased number of channels until a determined further signal quality is worse than a signal quality associated to the one or more number of channels already considered, and to determine the optimal number of channels on the basis of the determined signal qualities.

16. The configuration node of claim 15, wherein the processor is further configured to allocate the at least one selected channel to base stations of the cellular network according to a pattern.

17. The configuration node of claim 15, wherein the allocation pattern is regular or is a random distribution of the selected channels among base stations of the cellular network.

18. The configuration node according claim 15, wherein the processor is further configured to determine a quality of each channel of the set of channels and to rank the channels of the received set of channels according to the determined channel quality.

19. The configuration node of claim 15, wherein the received set of channels is ranked according to a quality.

20. The configuration node of claim 15, wherein the received set of channels comprises channels associated with at least one quality parameter.

21. The configuration node of claim 15, the configuration node further comprising a receiver configured to receive measurements of a signal quality in the cellular network for multiple numbers of channels, wherein the processor is further configured to determine the optimal number of channels on the basis of the received measurements.

22. The configuration node of claim 15, wherein the processor is further configured to determine for multiple numbers of channels a signal quality in the cellular network, and to determine the optimal number of channels on the basis of the determined signal qualities.

23. The configuration node of claim 15, wherein the processor is further configured to allocate a selected channel having a higher ranking more often than a selected channel having a lower ranking.

24. The configuration node of claim 15, wherein the receiver is further configured to receive, from a database, a number of sets of channels of the at least onechann primary system, wherein each set is associated individually with one particular base station or group of base stations of the cellular network.

25. The configuration node of claim 15, wherein the processor is further configured to observe a number of quality rankings of the channels of the set or sets of channels individually for one particular base station or group of base stations of the cellular network.

26. The configuration node of claim 15, wherein the signal quality is indicative of a cell edge interference in the cellular network.

27. The configuration node of claim 15, wherein the processor is further configured to determine, on the basis of the ranked set of channels, an optimal pattern for allocation of channels of the set of channels to base stations of the cellular network, such that a signal quality in the cellular network is optimized; and to select the at least one channel for allocation to base stations of the cellular network also on the basis of the determined optimal pattern.

28. The configuration node of claim 15, wherein the configuration node is a base station or an Operational Support System (OSS).

29. A non-transitory computer-readable medium comprising, stored thereupon, a computer program comprising program code to be executed by at least one processor of a configuration node of a cellular network, wherein the program code is configured so that execution of the program code causes the configuration node to:
receive, from a database, a set of channels of the at least one primary system;
observe a quality ranking of the channels of the received set of channels;
determine an optimal number of channels for the cellular network on the basis of the ranked set of channels such that a signal quality in the cellular network is optimized; and
select, from the received set of channels on the basis of the quality ranking and the determined optimal number of channels, at least one channel for allocation to base stations of the cellular network;
wherein the program code is configured so that execution of the program code further causes the configuration node to:
determine a signal quality for a number of channels;
increase the number of channels and determining a further signal quality for the increased number of channels until a determined further signal quality is worse than a signal quality associated to the one or more numbers of channels already considered; and
determine the optimal number of channels on the basis of the determined signal qualities.

* * * * *